Inventors,
Richard E. Whipple,
Bernard J. Rothmel,
by Francis K. Doyle
Their Attorney.

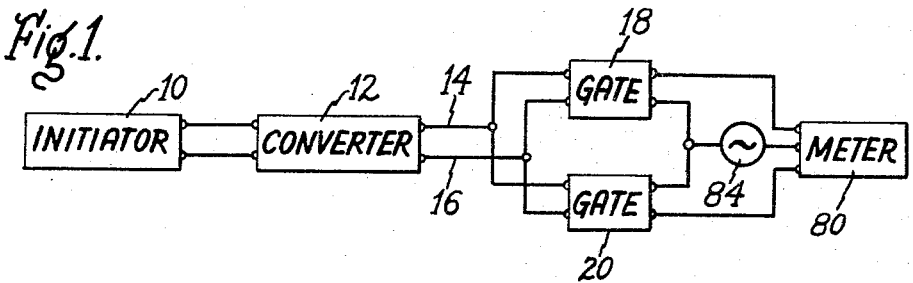
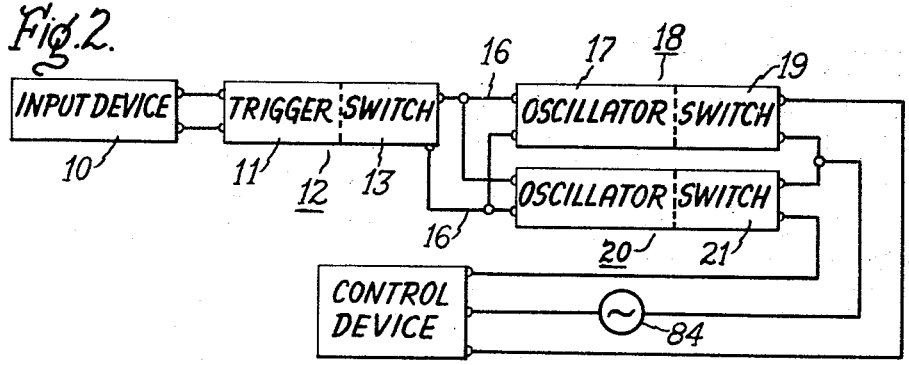
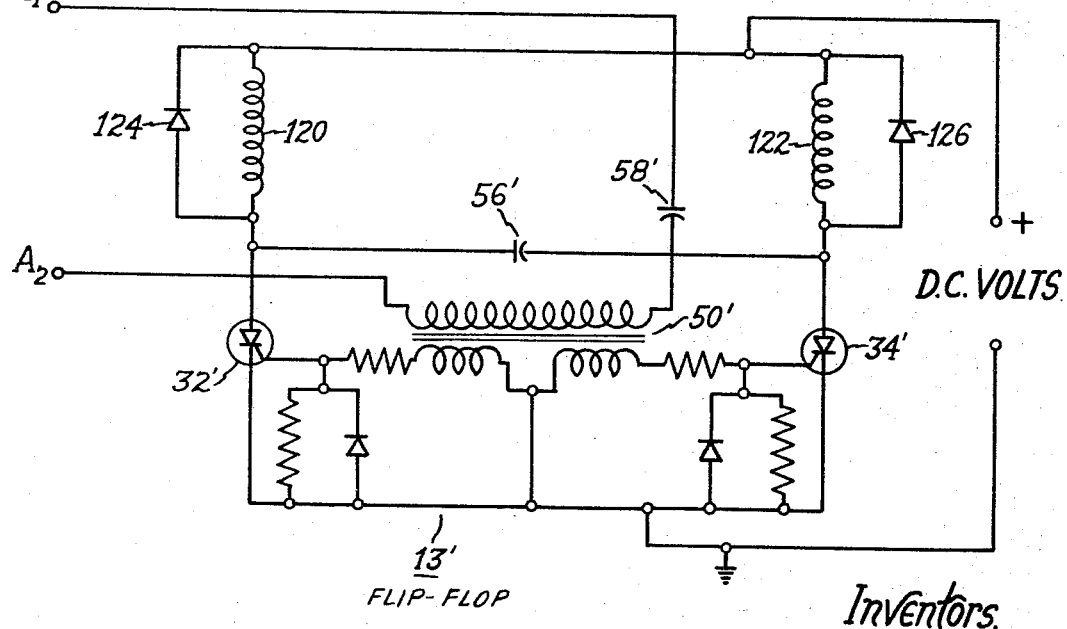

United States Patent Office 3,348,067
Patented Oct. 17, 1967

3,348,067
SOLID STATE IMPULSE GENERATOR USING SILICON CONTROLLED RECTIFIERS FOR SWITCHING
Richard E. Whipple, Rochester, N.H., and Bernard J. Rothmel, Lexington, Mass., assignors to General Electric Company, a corporation of New York
Continuation of application Ser. No. 191,620, May 1, 1962. This application Mar. 17, 1965, Ser. No. 445,830
4 Claims. (Cl. 307—88.5)

ABSTRACT OF THE DISCLOSURE

An impulse generator using solid state components to provide electrical impulses for operating an electrical device such as a demand meter. The impulse generator is actuated by electrical signals which are converted to D.C. polarized signals in a convertor device. Conversion is accomplished by means of a triggering circuit actuated by the input signals to operate a flip-flop solid state electrical circuit. The polarized D.C. signals from the flip-flop circuit are used to operate a pair of oscillators. Each oscillator, when in operation providing a substantially continuous voltage to a silicon controlled rectifier to place such rectifier in a conducting condition. The conducting rectifier connects the electrical device, such as a demand meter, to a source of electrical energy.

---

This invention relates to impulse generators, and more particularly to a solid state impulse generator for use in metering of electrical values and the like.

This is a continuation of application Ser. No. 191,620, filed May 1, 1962 now abandoned.

As is well known to those skilled in the metering art, the concept of demand is associated with the metering of electrical energy. It has been derived in an effort to equitably recover the capital cost of equipment. Electrical generating and distribution equipment which is installed by utilities must be capable of handling the peak load which may occur from the total requirements of the utility's customers. However, such equipment, in general, will have greater capacity than is normally required by the customer. To recover the cost of this equipment various known demand devices measure the peaking effects of the individual customer installations by determining the peak of the real power required by the customer over specified time intervals. Those customers who have high peak demands during such time intervals, in comparison to their average load, are required to pay an added charge based upon this peak demand as their share of the cost of the increased capacity required to be maintained by the utility. In the general field of the demand metering art, the demand devices are utilized to obtain quantitative information relative to time.

Demand meters are generally of two types, one of which is a direct driven device and the other a contact or impulse operated device. In the direct driven device the demand meter is generally mounted in the same case as a watthour meter and is directly driven from the watthour meter rotor or shaft. In the contact or impulse operated device, a contact or impulse means is provided in the watthour meter casing and the demand meter is separated therefrom. The contact or impulse means is driven by the watthour meter shaft and produces electrical impulses as the watthour meter rotates. Each impulse represents a predetermined number of watthours according to the gear ratio of the contact means. These impulses are delivered in some manner to the demand meter and are there converted to desired electrical indications. This invention is generally concerned wtih impulse generators, especially a generator suitable for generating the electrical impulses from the watthour meter to operate the demand meter.

In present day metering installations, the impulse generators are used to develop electrical impulses in response to the incremental use of electrical power. In general, a metering device such as a watthour meter is used to measure the incremental use of electrical power. Various means may be provided in the meter to sense such incremental use. These means will provide an output signal from the meter which is used to actuate an impulse generator. The generator develops electrical impulses which are then used to operate a demand metering device, which records or indicates the quantitative information relating to the use of electrical power in relation to time.

Present day impulse generators utilize various types of electrical contacts, actuated by relays or the like, to develop the desired electrical pulse. In many instances, the pulse is an on and off signal, actuating the demand meter device. For relatively slow rates of use, especially where low power requirements are involved, these types of contact devices have performed satisfactorily. However, in many modern installations, where electrical energy is used at a high rate and in large power billing installations, as well as in many types of electronic totalizing and telemetry systems, contact devices have been found to be inadequate to perform the desired metering function. The contact devices wear rapidly in such systems and require frequent replacement in order to ensure accurate metering. Further, the contact devices have a tendency to bounce, thus generating erroneous pulses or failing to generate desired pulses. For example, failing to turn the demand meter on and off. Also it has been noted that contact noise in the operation of the contact device impairs the accuracy of the metering system. For these reasons there is presently a need in the metering field for an impulse generating device which will obviate the various disadvantages found in the impulse generators of the contact type.

It is, therefore, one object of this invention to provide a solid state impulse generator which does not utilize moving parts.

A further object of this invention is to provide a contactless impulse generator.

A still further object of this invention is to provide an impulse generator which is actuated by an electrical signal, such impulse generator developing electrical impulses without the aid of any electromechanical devices.

An impulse generator according to one form of this invention comprises: a converter device which utilizes an electrical signal generated by an input device to provide a polarized D.C. output voltage. The output of the converter is fed to a gating circuit, utilizing solid state electrical components. This circuit is actuated by the polarized D.C. voltage to turn on and off the solid state components to thereby act as an on-off contact means for actuation of a control device. By means of the impulse generator of this invention the output of a metering device may be fed to a demand meter and actuate the demand meter to obtain the desired quantitative information on the usage of electrical energy relative to a given period of time.

The invention which is desired to be protected will be clearly pointed out and distinctly claimed in the claims appended hereto. However, it is believed that this invention and the manner in which its various objects and advantages are obtained, as well as other objects and advantages thereof, will be better understood from the following description of a preferred embodiment thereof, when taken in connection with the accompanying drawing in which:

FIGURE 1 is a block diagram of the solid state impulse generator of this invention, showing it in connection with an initiator in a metering device;

FIGURE 2 is an expanded block diagram, similar to FIG. 1, showing the components in greater detail;

FIGURE 4 is a schematic wiring diagram of a modified form of solid state impulse generating device, especially useful with D.C. control devices.

Figure 3:
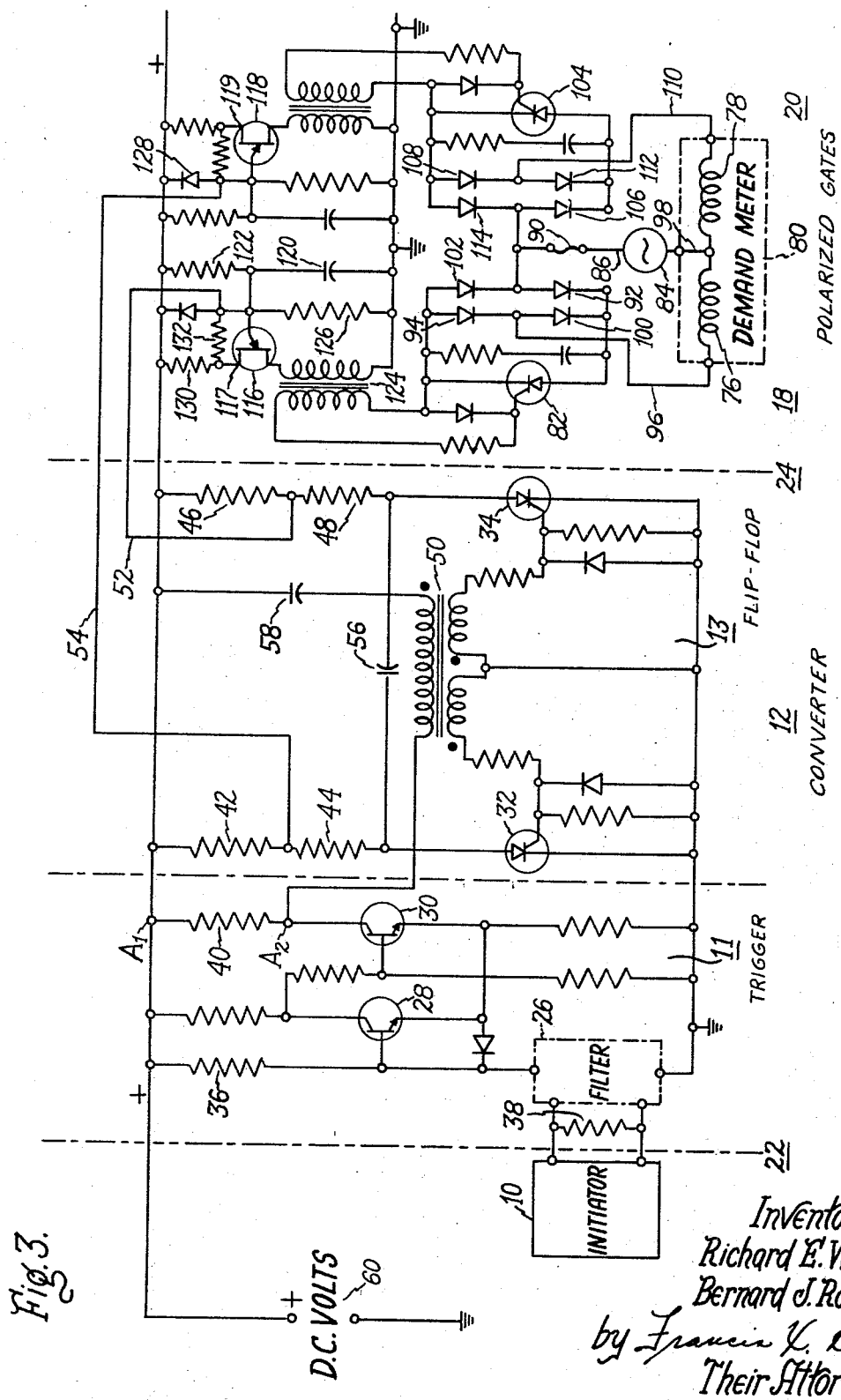
FIGURE 3 is a schematic wiring diagram of a preferred form of solid state impulse generating device according to this invention.

Referring now to the drawings, in which like numerals are used to indicate like parts throughout the various views thereof, a solid state impulse generator is shown which may be utilized in an electric power metering installation. Referring specifically to FIG. 1 of the drawing, a block diagram of a preferred embodiment of this invention is shown. In FIG. 1 block 10 is an initiator which initiates pulses or electrical signals in accordance with the usage of electrical energy. In general, the initiator 10 will be mounted in a watthour meter which is used for measuring the consumption of electrical energy. Initiator 10 will be driven by such watthour meter. One example of an initiator, which has been found to be especially useful in connection with this invention, inasmuch as it does not require any contacts in the watthour meter, is shown and described in application Ser. No. 103,608, filed Apr. 17, 1961, for Impulse Generator for Demand Metering, in the name of Richard E. Whipple, one of the inventors herein, now Patent No. 3,114,081 issued Dec. 10, 1963, and which is assigned to the same assignee as the present invention.

Still referring to FIG. 1 of the drawing, the initiator 10 generates electrical signals which are fed to a converter circuit 12 where they are converted, by means of solid state electrical components, to a polarized D.C. signal. The polarized D.C. signal is fed from the converter 12 over the lines 14, 16 to one of two polarized gates 18, 20 depending upon the polarization of the D.C. signal. The output of gates 18 and 20 is utilized to actuate a demand meter, block 80, in the manner of an electrical contact device. The gates 18 and 20 operate to connect the demand meter 80 to a source of electrical energy, such as A.C. source 84. However, due to the fact that they utilize solid state electrical components none of the deficiencies which have been hereinbefore pointed out, with reference to contact devices, are found in the present system.

FIGURE 2 of the drawing is a block diagram, similar to FIGURE 1, but showing the various components of the impulse generator in greater detail. The initiator 10 may be any type of input device which develops an electrical signal. In general, it is preferred that it be an initiator of the variable resistance type, such as disclosed in aforesaid Patent 3,114,081. The signal from initiator 10 is fed to the converter 12. As shown, converter 12 preferably comprises a trigger circuit 11 and a flip-flop circuit 13. The trigger circuit 11 may be any type of trigger circuit which can use the signal from initiator 10 to operate the flip-flop circuit 13. In the preferred embodiment, using a variable resistance initiator 10, it is a type having two switching points, one at a high voltage level and the other at a low voltage level.

A flip-flop circuit 13 is actuated by the trigger circuit 11. The flip-flop circuit may be an amplifier, a polarizer or a D.C. switch, rather than a known flip-flop circuit, if desired. However, it must be actuated by the output of the trigger circuit 11 to develop an output which will operate the gate circuits 18 and 20 to an on and off condition. In the preferred embodiment, the flip-flop circuit 13 develops a polarized D.C. output voltage. The polarized D.C. voltage from the converter 12 operates the gates 18 and 20, to turn them on and off, similar to a switch contact. As shown, each of the gate devices comprises an oscillator, such as oscillator 17 and a switch means, such as switch 19. The oscillator 17 is actuated by the polarized signal to provide a continuous voltage to the switch 19 to place the switch in its on condition. Of course, it will be understood that a magnetic amplifier could be used in place of the oscillator, in each gate circuit if desired. Each of the switches, switch 19 in gate 18 and switch 21 in gate 20, act to connect a control device, such as a demand meter, relay or the like to a source of electrical energy, when the switch is in its on condition.

Referring now to FIG. 3 of the drawing, there is shown a detailed electrical schematic circuit diagram of a preferred embodiment of the solid state impulse generator of this invention. As shown in FIG. 3, the converter device 12 is that portion of the diagram between the lines 22 and 24 while the polarized gates 18 and 20 form the remainder of the diagram. Referring first to the converter switch 12, which is shown between lines 22 and 24, it will be understood that the output of the initiator 10 is fed to the converter 12 through a low-pass filter, shown as the dotted box 26. The low-pass filter is utilized to remove any RF pickup which may be present in the output of the initiator 10. The converter circuit 12 comprises a trigger circuit 11 formed by the transistors 28 and 30, and a flip-flop circuit 13 comprising the rectifier devices 32 and 34.

The output of the initiator 10, for example the photosensitive cell disclosed in Patent 3,114,081, is fed to the converter 12 by a voltage divider network consisting of the resistors 36 and 38. The transistors 28 and 30 form a triggering circuit 11 which has two switching points. In the design set forth in FIG. 3 a high voltage, resulting from a high resistance in the initiator, for example 10 volts, is required to cause the transistor 28 to begin to conduct; while a low voltage, resulting from a low resistance in the initiator, for example less than 3 volts, will cause transistor 30 to conduct, thereby preventing the conduction of transistor 28. Thus, the variable resistance output of the initiator 10, when combined with the voltage divider 36, 38, will result in a variable voltage at the base of transistor 28. A high level voltage will fire the transistor 28 while a low level voltage will fire the transistor 30. An intermediate level of voltage, which is below the firing point of 28 and above the firing point of 30, will cause no change in the circuit. This provides a dead band in the triggering circuit 11 which will offer protection against any false, low level impulses not completely filtered out from the initiator circuit. It will also provide time for the detent mechanism, which is shown in the initiator of Patent 3,114,081, to act to stop the disk of the initiator from rotation.

When the transistor 30 is switched on, a voltage will appear across the resistor 40; however, when the transistor 30 is off, there will be no voltage across the resistor 40. Thus, by means of the triggering circuit 11 set forth, including transistors 28 and 30, the signal from the initiator 10 is converted to a "full on" and "full off" type of switching signal by the voltage across the resistor 40.

As indicated, the converter 12 also includes a flip-flop circuit 13 comprising the rectifiers 32 and 34. The rectifiers, as shown, are preferably silicon-controlled rectifiers. The load resistors 42, 44, 46, and 48 of the rectifiers 32 and 34 are formed into a bridge circuit. The circuit is designed, as shown, such that a plus voltage in the pulse transformer 50 at the gate of the rectifier 32 will cause rectifier 32 to conduct. With rectifier 32 conducting, current is drawn from the plus side of the line through resistors 42 and 44 and the rectifier 32. It should also be noted that current will be drawn from the plus side of the line through the resistor 46, the line 52 into the polarized gate 18 and 20, the line 54 from the polarized gate 18 and 20, resistor 44 and rectifier 32. Thus it can be seen, that by means of the conduction of the controlled rectifier 32 the output line 52 becomes plus voltage while the output line 54 has a negative voltage.

Of course, it will be readily apparent, that during the conduction of the controlled rectifier 32 the capacitor 56 will become charged with its minus charge to the rectifier 32 and a positive charge to the rectifier 34. If a negative voltage is placed upon the pulse transformer 50, the rectifier 34 will be caused to conduct. As rectifier 34 conducts the capacitor 56 will discharge through rectifier 34. The back voltage of capacitor 56, which is opposite to that of rectifier 32, is placed across rectifier 32 when rectifier 34 is turned on. This will cause rectifier 32 to stop conducting. At this point, the current path through the rectifier 34 will be from the plus side through resistor 46, resistor 48, and the rectifier 34. A second current path will be through the resistor 42, the output line 54 to the gates 18 and 20, the output line 52, resistor 48, and rectifier 34. As will be apparent, with this change in conduction, the output line 54 now becomes positive voltage while the output line 52 becomes negative voltage. Obviously, the magnitude of this output voltage will depend upon the bridge relation of the resistors 42, 44, 46, and 48, and the load resistance which is in the polarized gates 18 and 20.

From the circuit set forth in FIG. 3, it will be apparent that the pulses which cause the circuit 13 to flip flop are derived from the transistor 30 when transistor 30 is turned on. As will be noted from the drawing, the capacitor 58, in series with the transformer 50 is in parallel circuit relation with resistor 40. These components form a pulse circuit. When the transistor 30 is on, it will draw current through resistor 40 in parallel with capacitor 58 causing a charging current to flow to capacitor 58 and causing a positive pulse in the transformer 50. When the transistor 30 is turned off, capacitor 58 will discharge through transformer 50 and resistor 40 thereby causing a negative pulse in the transformer 50.

From the above description, it can be seen that by means of the converter circuit 12, utilizing the triggering circuit 11 and the flip flop circuit 13, that the converter provides a polarized output voltage in response to the input from the initiator 10. Of course, it will be understood that a D.C. voltage source is provided for the converter 12, the voltage source being indicated at 60.

Still referring to FIG. 3 and to the portion thereof to the right of line 24, the circuit for the polarized gates 18 and 20 of the solid state impulse generator of this invention is shown. As indicated in FIG. 3, the D.C. power for the polarized gates may be obtained from the same source as that utilized for the converter 12. Of course, it will be understood, that any other source of D.C. power may also be utilized if desired. As will be understood, the present day demand meters and totalizing equipment have extreme ranges in voltage levels which may range from 120 volts A.C. to 150 volts D.C. Further, these devices have a large current range which may extend from 5 to 500 milliamps. In view of the large range of voltage and currents which must be switched, a pair of silicon controlled rectifiers has been designed into a bridge rectifier circuit where all the signals can be controlled as if they were D.C.

As can be seen from FIG. 3, the gates 18 and 20 are utilized as contact devices to control the flow of current within the coils 76 and 78 of a demand meter 80. Of course, it will be understood, that the demand meter 80 is merely shown as an indication of the use of the solid state impulse generator of this invention. It will be readily apparent to those skilled in the art that the solid state impulse generator may be utilized as a contact means for any other type of device other than for the demand meter 80, if desired.

Referring to FIG. 3, and assuming that the controlled rectifier 82 of the polarized gate 18 has been turned on, then the A.C. line current from the source 84 on the plus cycle will flow from the line 86; the fuse device 90, the rectifier 92, the control rectifier 82, rectifier 94 and line 96 through coil 76 and through line 98 to the other side of the source 84. The negative cycle of current will of course flow through the line 98, coil 76, the line 96, rectifier 100, control rectifier 82, rectifier 102, fuse 90, and line 86 to the other side of source 84. Thus it will be apparent, that when the control rectifier 82 is on it acts as a closed contact for the currents flowing from the source 84. Obviously, when the rectifier device 82 is off it will act as an open contact and therefore no voltage will flow from the source 84.

Of course, it will be understood that the controlled rectifier 104 of the polarized gate 20 operates in the same manner as a contact device when in its on and off condition. For example, when the rectifier 104 is in its on condition, current on the plus cycle from source 84 would flow through line 86, fuse device 90, rectifier means 106, the controlled rectifier 104, rectifier means 108, line 110 to the coil 78 of the meter 80, and through line 98 to the opposite side of source 84. The current on the negative part of the cycle would, of course, flow through line 98, coil 78, line 110, rectifier device 112, control rectifier 104, rectifier 114, fuse 90, and line 86 to the other side of the source 84. Thus it can be seen that in the circuit set forth, utilizing the controlled rectifiers 82 and 104, that the rectifiers will act as contact devices, being a closed contact when the rectifier is turned on and being an open contact when the rectifier device is turned off.

As will be understood, the control of the silicon controlled rectifier devices 82 and 104 is obtained by applying a positive voltage to its gate means. Inasmuch as a rectified A.C. voltage goes to zero, if the voltage source for the circuits shown were rectified A.C., as is desirable, then each of the controlled rectifiers 82 and 104 would be turned off as the current of their turn on voltage collapses. To overcome this problem, another positive pulse must be applied to the controlled rectifier gate. However, due to the different phase relationships of the different demand meter coils, timing of the turn on pulse becomes critical in order to utilize the full energy in a given cycle.

To overcome this critical area, an oscillator has been added which will continually provide a pulse to the controlled rectifier gate at a rate which is many times greater than the usual 60 cycles per second in order to always maintain the control rectifier in an on state and obtain full cycle energy for each rectified cycle. As shown, the transistor devices 116 and 118 are provided as oscillators for the polarized gates 18 and 20, respectively.

As indicated in the drawing, the transistors 116 and 118 are of the type termed "unijunction" transistors and are provided with a negative resistance range. As will be understood these transistors also have a firing threshold which varies with the voltage applied to the base 117 and 119, respectively. As the emitter voltage is increased, the emitter current increases a small amount until the firing threshold is reached. At that point, the junction breaks down and the emitter and base currents increase many times. The emitter voltage must then be reduced to a low value in order to turn the transistor off. This is called the valley point.

As shown, for the transistor 116, a capacitor 120 in series with a resistor 122 forms an RC circuit. As capacitor 120 charges up through the resistor 122 the emitter threshold voltage of transistor 116 is reached. At this point transistor 116 will suddenly conduct. The capacitor 120 will discharge through the emitter of the transistor 116. When the voltage of capacitor 120 drops below the valley point of the transistor, the transistor will stop conducting and the capacitor 120 will again begin to recharge through resistor 122. When the charge reaches the threshold again, the cycle will repeat.

For each cycle the transistor 116 will conduct heavily and a short duration voltage signal or pulse will appear across the primary of the pulse transformer 124. Through the secondary of transformer 124 such pulse will appear at the gate of the control rectifier 82 such of the polarized gate 18. It will be understood that the frequency of the oscillation of transistor 116 will depend upon the RC time constant of the capacitor 120 and resistor 12. Of course, if a suitable resistor is placed in parallel with capacitor 120, the maximum voltage to which capacitor 120 may be charged can be limited.

As shown in FIG. 3, a resistor 126 has been placed in parallel with capacitor 120, such that the capacitor cannot charge up to the required threshold voltage of the transistor 116. Thus in its normal state the transistor 116 will never be brought to its threshold firing value. However, as was earlier mentioned the threshold firing of a transistor may be varied by varying the voltage applied to the base of the transistor. A lower applied voltage at base 117 will result in a lower threshold value; therefore, if the voltage applied to the base 117 of transistor 116 can be forced below the critical value, which is established by the resistor 126, the transistor 116 can be oscillated and the control rectifier 82 turned on.

By applying a positive input voltage to the transistor 116 over the input line 54 from the converter 12, the current will flow from the line 54, rectifier 128, resistor 130, resistor 132, and the input line 52 back to the converter 12. The voltage drop across the resistor 130 which is created by this current will lower the voltage at base 117 of the unijunction transistor 116 and cause the transistor to begin to oscillate. The reduction, removal, or the reversal of the voltage will prevent the oscillation. Of course, from the circuit shown in FIG. 3 it will be obvious that reversal of the voltage, that is, the positive voltage coming in over the input line 52 and returning over input line 54 will cause transistor 118 to oscillate which will thereby turn on the control rectifier 104 of polarized gate 20. From this it will be apparent that the polarized voltage from the converter 12 will turn on the oscillator formed by the transistor 116 or the oscillator formed by the transistor 118, depending upon the polarity of the applied signal voltage from the converter 12. Therefore, the control rectifiers 82 and 104 can be controlled from the D.C. polarized voltage from the converter 12. Thus by means of the oscillator circuits the control rectifiers 82 or 104 may be turned on and off by use of the polarized D.C. signal from the converter 12. Obviously, the control rectifiers 82 and 104 will operate as contact devices without any of the problems hereinbefore discussed which are found in the mechanical contact devices. In some cases it is required that the control device, indicated in FIG. 2, be a D.C. control device. For example, in some power circuits a D.C. demand meter is used. In these cases the various problems of electromechanical contact devices are even more severe than in the case of A.C. control devices. In order to provide the desired control of D.C. control devices, the invention is modified as indicated in FIG. 4 of the drawing. In this embodiment of the invention, the controlled part of the control device is placed in the flip-flop circuit 13', which is very similar to flip-flop 13 of FIG. 3. In this case the flip-flop 13' will act as an on-off switching means, and the polarized gates 18 and 20 of FIG. 3 are unnecessary.

Referring to FIG. 4, a flip-flop circuit 13' is shown, which may be connected directly to resistor 40 of the trigger circuit 11, shown in FIG. 3. This connection is made at points A₁, A₂ of FIG. 3, as indicated. With this connection, the turning on and off of the transistor 30 will provide voltage pulses to the transformer 50', in the manner previously discussed with reference to FIG. 3. A positive pulse in transformer 50' will turn on controlled rectifier 32', causing it to begin conducting. As controlled rectifier 32' conducts, a current will flow through the coil 120, from one side of the D.C. voltage source, through rectifier 32' to the other side of the source. Of course, it will be understood that the voltage pulse in transformer 50' also charges capacitor 58'.

When transistor 30 (FIG. 3) is turned off, the capacitor 58' will discharge through transformer 50', providing a negative pulse, which will turn on control rectifier 34'. With rectifier 34' conducting a current will flow from the D.C. source, through the coil 122, rectifier 34' to the other side of the voltage source.

As discussed, with reference to FIG. 3, when rectifier 32' is conducting, the capacitor 56' will be charged. As the rectifier 34' conducts, the capacitor 56' is discharged through rectifier 34'. The back voltage of capacitor 56', across rectifier 32' will cause rectifier 32' to stop conducting.

From the above circuit it will be apparent that the controlled rectifiers 32' and 34' will act as a switching means, causing current to flow in either coil 120 or coil 122, as desired. The rectifiers or diodes 124, 126 are placed in parallel with the coils 120, 122, respectively. These rectifiers are provided to protect the controlled rectifiers 32', 34' when the field in the coils 120, 122 collapses. As will be understood, the collapse of the field in the coil will provide a sudden surge which could break down the rectifier.

It will be clear that if coils 120 and 122 are the coils of a D.C. demand meter, that the circuit will turn such demand meter on or off in the same manner as the circuit shown in FIG. 3. Thus, by replacing the load resistors of the flip-flop circuit 13 with the control parts of a control device, such as the coils 120, 122, the flip-flop circuit 13' is obtained, which will act as an on-off switch for such control device.

From the above description of a preferred embodiment thereof, it will be apparent that there is provided by means of this invention an impulse generator for use in driving a demand meter, and the like control device, which does not utilize any contacts, or electromechanical devices or other moving parts. Thus the impulse generator utilizing only solid state components may be utilized in high power and rapid rate lines without any of the problems inherent in the former contact type of impulse devices. Of course, it will be obvious to those skilled in the art, that the various values of the different electrical components, resistors, capacitors, and the like, will depend upon the desired voltages and currents to be used with the various transistors and controlled rectifiers of the solid state impulse generator of this invention. No values have been assigned to these electrical components, since it is believed obvious that they may be set by anyone skilled in the art, depending upon the types of transistors and rectifiers utilized in such circuit. Of course, while the present preferred embodiments of this invention have been described in great detail, it will be understood that various changes may be made in the various circuit devices, as desired, without departing from the spirit and scope of this invention. Thus the invention is not to be considered as limited by the above description, but only as necessary within the scope of the claims which are appended hereto.

What is claimed as new and which it is desired to secure by Letters Patent of the United States is:

1. A solid state impulse generator for operating a control device comprising, an electrical converter having an input and an output for converting variable voltage inputs to polarized voltage outputs, said converter including a trigger circuit electrically connected to the input of said converter, said trigger circuit including a transistor rendered conducting and non-conducting in response to the voltage level of variable voltage inputs, said converter also including a pair of silicon controlled rectifiers, means coupling said rectifiers together to form a flip-flop circuit, said flip-flop circuit electrically connected to said transistor and responding to the conducting state of said transistor to provide a first polarized output signal from said converter and responding to the non-conducting state of said transistor to provide a second polarized output signal, an electrical gate circuit including a second pair of silicon controlled rectifiers electrically connected to the output of said converter, said second pair of rectifiers being connected in parallel circuit relation, one of said second pair of rectifiers rendered conducting in response to said first polarized output signal and the other of said second pair of rectifiers rendered conducting in response to said second output signal.

2. A solid state impulse generator for controlling a control device comprising: a trigger circuit having an input, said trigger circuit including a transistor rendered conducting and non-conducting in response to the voltage level of input signals, a switching circuit electrically connected to the output of said transistor, said electrical connection being a pulse transformer with a capacitor in series with the primary of said pulse transformer, said switching circuit including a pair of silicon controlled rectifiers, means including the secondary of said pulse transformer coupling said rectifiers together to form a flip-flop circuit, said flip-flop circuit responding to the conducting state of said transistor to provide a first polarized output signal and responding to the non-conducting state of said transistor to provide a second polarized output signal, control means connected in electrical circuit relation with said flip-flop circuit and adapted to respond to said polarized signals.

3. A solid state impulse generator as claimed in claim 2 in which said control means is a second switching circuit comprising a pair of silicon controlled rectifiers connected in parallel circuit relation, and in which means are provided in electrical series circuit relation between said one switching circuit and said second switching circuit for providing a substantially continuous pulse signal to one of said silicon controlled rectifiers connected in parallel circuit relation in response to one of said polarized signals.

4. A solid state impulse generator for operating a control device comprising: a trigger circuit including a pair of transistor devices, means coupling said transistors in circuit relation, input signal means to said trigger circuit, said transistors rendered conducting and nonconducting in response to the voltage level of variable voltage input signals, a switching circuit comprising a pair of silicon controlled rectifiers electrically connected together to form a flip-flop circuit, a pulse transformer connected in circuit with said rectifiers, said pulse transformer being connected in circuit with the output of one of said transistors, said pulse transformer responding to the conducting state of said one transistor to render conducting one of said rectifiers and said pulse transformer operating in response to the non-conducting state of said one transistor to render conducting the other of said rectifiers, said flip-flop circuit providing a first polarized output signal when said one of said rectifiers is conducting and providing a second polarized output signal when said other of said rectifiers is conducting, a second electrical switch device including a pair of silicon controlled rectifiers connected in parallel circuit relation, a pair of unijunction transistors, each of said unijunction transistors connected in series circuit with one of said rectifiers in parallel circuit relation, each of said unijunction transistors being connected to said first switching circuit, one of said unijunction transistors responding to said first polarized signal to provide a continuous pulse signal to one of said control rectifiers in parallel circuit relation and the other of said unijunction transistors responding to said second polarized signal to provide a substantially continuous pulse signal to the other of said rectifiers in parallel circuit relation.

References Cited

G.E. Notes on the Application of the SCR, December 1958, ECG–371–1, pp. 60, 61, 69, 70, 71.

ARTHUR GAUSS, *Primary Examiner.*

JOHN S. HEYMAN, *Examiner.*